(12) United States Patent
Jones et al.

(10) Patent No.: US 10,041,328 B2
(45) Date of Patent: Aug. 7, 2018

(54) METHOD FOR USING MANAGED PRESSURE DRILLING WITH EPOXY RESIN

(71) Applicant: HALLIBURTON ENERGY SERVICES, INC., Houston, TX (US)

(72) Inventors: Paul Joseph Jones, Housston, TX (US); Gary P. Funkhouser, Roman Forrest, TX (US); Ronnie Glenn Morgan, Waurika, OK (US); James Randolph Lovorn, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/516,867

(22) PCT Filed: Dec. 10, 2014

(86) PCT No.: PCT/US2014/069605
§ 371 (c)(1),
(2) Date: Apr. 4, 2017

(87) PCT Pub. No.: WO2016/093827
PCT Pub. Date: Jun. 16, 2016

(65) Prior Publication Data
US 2017/0292345 A1    Oct. 12, 2017

(51) Int. Cl.
E21B 21/08    (2006.01)
E21B 43/10    (2006.01)
E21B 33/14    (2006.01)
E21B 34/16    (2006.01)
C09K 8/42     (2006.01)

(52) U.S. Cl.
CPC ............... *E21B 33/14* (2013.01); *C09K 8/42* (2013.01); *E21B 34/16* (2013.01)

(58) Field of Classification Search
CPC ........... E21B 21/08; E21B 47/06; E21B 43/10
See application file for complete search history.

(56) References Cited

U.S. PATENT DOCUMENTS 5,875,844 A      3/1999  Chatterji et al.
6,906,009 B2 *   6/2005  Shinbach ............... C09K 8/03
                                                     507/103

(Continued)

FOREIGN PATENT DOCUMENTS

WO    2012140445 A2    10/2012

OTHER PUBLICATIONS

International Search Report and Written Opinion of the International Searching Authority dated Dec. 10, 2014 filed in related application PCT/US2014/069605.

(Continued)

*Primary Examiner* — Catherine Loikith
(74) *Attorney, Agent, or Firm* — McAfee & Taft

(57) ABSTRACT

A method of controlling the equivalent circulating density of an epoxy resin, used to cement a wellbore, the method includes introducing an epoxy resin into an annulus defined by a casing string and an inner wall of the wellbore. Backpressure is asserted on the epoxy resin as it flows through the annulus. Some embodiments include adjusting the cross sectional area of the annulus exit using a valve or other mechanism to control the backpressure and thus increase or decrease the equivalent circulating density of the epoxy resin.

19 Claims, 3 Drawing Sheets

(56) References Cited

U.S. PATENT DOCUMENTS

| | | | |
|---|---|---|---|
| 7,836,973 B2 * | 11/2010 | Belcher | E21B 17/042 |
| | | | 175/25 |
| 2001/0009133 A1 | 7/2001 | Chatterji et al. | |
| 2008/0060846 A1 | 3/2008 | Belcher et al. | |
| 2010/0288507 A1 | 11/2010 | Duhe et al. | |
| 2013/0118752 A1 | 5/2013 | Hannegan et al. | |
| 2016/0326300 A1 * | 11/2016 | Gelves | C09K 8/80 |

OTHER PUBLICATIONS

Chris Carpenter—Managed-Pressure-Drilling Technology Succeeds in the Harding Field, SPE 166170, May 2014.
Johan Eck-Olson, Elin Vollen, Tim Tennison et al.—First UBO in Norway Incorporates, Innovative Cement Design, Detailed Operational Planning, Drilling Contractor Article, Jul./Aug. 2006.
Examiner's Report dated Mar. 8, 2018 in related Canadian patent application No. 2,965,620, Halliburton Energy Services, Inc.

* cited by examiner

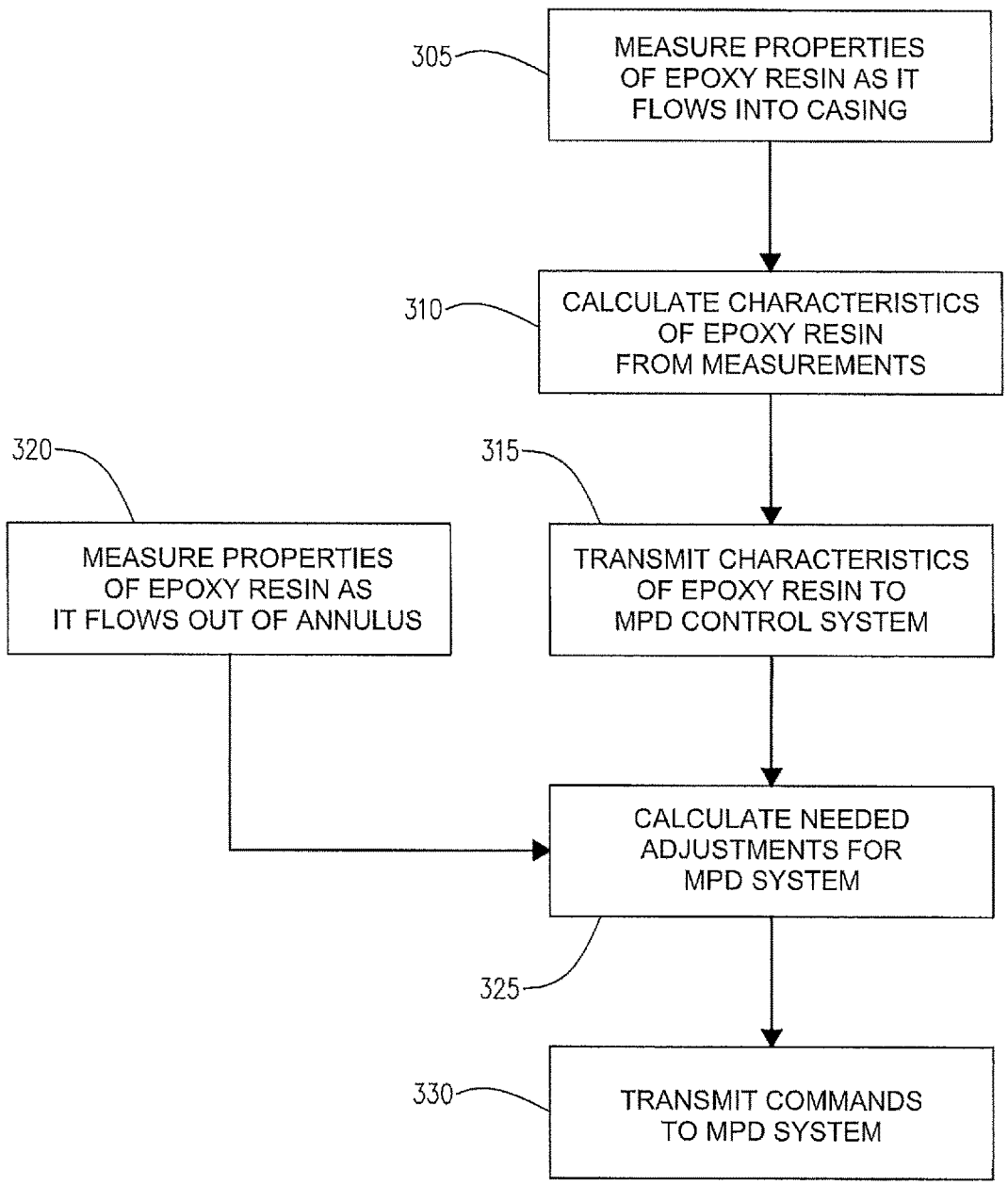
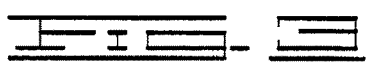

METHOD FOR USING MANAGED PRESSURE DRILLING WITH EPOXY RESIN

FIELD

The present disclosure relates to the drilling and completion of a well for the production of oil and gas from an underground formation. Specifically, the present disclosure relates to methods of cementing or fixing a casing string, or casing, in a wellbore.

BACKGROUND

To produce oil and gas out of a well, a wellbore is usually cemented. Typically, a casing string is placed inside a wellbore. A fluid is then pumped through the casing string. When the fluid encounters the bottom of the casing string, the fluid flows out of the casing string and upward through the annulus between the casing string and the wall of the wellbore. The fluid is then allowed to harden, thereby sealing the wellbore.

BRIEF DESCRIPTION OF THE FIGURES

FIG. 3 illustrates an example of how information can flow in the described method.

DETAILED DESCRIPTION

Figure 1:
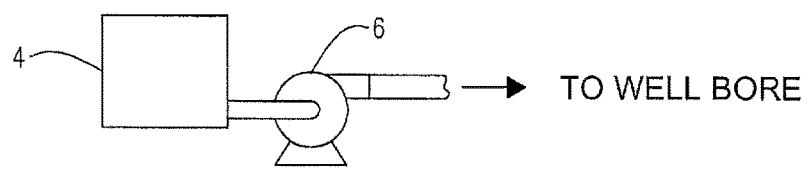
FIG. 1 illustrates an example of a system for preparation and delivery of a cement composition to a well bore.

The present disclosure provides a method for fixing or cementing a casing string in a wellbore in an underground formation. Although the term cementing is common in the oil and gas industry, cementing does not require the use of cement. For example, epoxy resin can be used to cement a well. An underground formation is a subterranean portion of the earth, often thought to contain hydrocarbons. Additionally, an underground formation can be a formation underneath the surface of the earth suitable for storing harmful chemicals. For example, a subterranean formation can include formations suitable for use as a class 1 disposal well. As such, although the present method relates to drilling for hydrocarbons, it can also be used to transmit chemicals for storage in an underground formation.

In various embodiments, the disclosed method provides an epoxy resin and introduces an epoxy resin into an annulus defined by a casing string in a wellbore and either the inner wall of the wellbore or the inner wall of larger casing. More specifically, in some embodiments the disclosed method relates to maintaining a controlled pressure of the epoxy resin in such an annulus.

Epoxy resins are reactive polymers and prepolymers which contain epoxide groups. Epoxy resins can be reacted, for example cross-linked, with themselves through catalytic homopolymerisation, or with a variety of coreactants including polyfunctional amines, acids, phenols, alcohols and thiols. As a result of such reactions, epoxy resins can change from a fluid with low viscosity to a hardened material resembling a solid. Compared to traditional cements used to fix casing string, epoxy resins have different chemical and physical characteristics including elasticity, chemical resistance, low density, strength and bonding.

Underground formations have a pore pressure and a fracturing pressure. The pore pressure of the formation is the pressure of formation fluids within the pores of a reservoir. The pore pressure can also be defined by the density of a fluid that provides a hydrostatic pressure equal to the pore pressure with a full column of fluid in the well. With impermeable rocks such as shale, the fluids cannot always escape and must therefore support the total overlying rock column, leading to very high pressures. As fluids are produced from the formation, the pore pressure of the reservoir can decline over time. The fracturing pressure of the formation is the pressure at which a treatment fluid introduced into the well causes fractures in the subterranean formation and causes the fluid resin to enter the formation.

The difference between the fracture pressure of the formation and the pore pressure of the formation is sometimes very small. Accordingly, slight fluctuations in the pressure of the epoxy resin within the annulus can cause the loss of epoxy resin into the formation through induced fractures, often referred to as lost circulation, or the introduction of unwanted fluids from the formation into the epoxy resin. To help control the pressure of the epoxy resin during cementing, the present disclosure provides a method for using managed pressure drilling techniques using epoxy resin. By controlling the backpressure of the epoxy resin during cementing, the pressure of the epoxy resin can be more accurately controlled.

Conventional cementing requires a fluid with sufficient density to maintain well control. Normally, this requires maintaining the pressure of the fluid above the pore pressure of the formation and below the fracturing pressure of the formation. For example, the combined hydrostatic pressure and friction pressure must remain below the fracturing pressure while pumping. In cases where the combined hydrostatic pressure and friction pressure exceed the fracturing pressure, lost circulation will occur.

To avoid breaking down the formation, a fluid with a density less than that required to maintain well control can be used by controlling the back pressure on the annulus. As friction pressure varies, the back pressure applied to the epoxy resin is adjusted to maintain the pressure of the epoxy resin in the annulus between the pore pressure and fracturing pressure of the formation. Epoxy resins are useful in this situation because they have lower density than typical Portland cement slurries. Epoxy resins also provide benefits in wellbore sealing because of the low permeability, good bonding to the casing and formation, and desirable mechanical properties of the epoxy resin.

In accordance with an embodiment of the method, the epoxy resin can be pumped through a casing string. When the epoxy resin encounters an opening in the casing string, such as a casing shoe check valve or an opening at the bottom of the casing string, the epoxy resin flows out of the casing string and up into the annulus between the casing string and the wellbore.

The annulus between the wellbore and the casing string can also have an exit located up-hole of where the casing is fixed in the wellbore. Therefore, a portion of the annulus can be defined as an exit, whether to the surface or to another component of the casing string up-hole from the portion of the casing being fixed in the wellbore. The disclosed method can include adjusting the annulus exit to apply backpressure to the epoxy resin. In some embodiments, the annulus exit is connected to or defined by a rotating control device. In such embodiments, the rotating control device seals the top of the annulus.

A rotating control device is a rotating sealing element or diverter which allows a pipe or string to enter and exit the wellbore while maintaining pressure in the annulus. The rotating control device also allows the pipe or string to rotate while maintaining pressure in the annulus. In some embodiments, the sealing elements of the rotating control device rotate with the pipe or string and is mounted on a bearing assembly.

The rotating control device can connect to a choke manifold. The cross sectional area of the annulus exit is defined by a choke manifold connected to the rotating control device. A choke manifold is a set of high pressure valves and associated piping, which control fluid flow across the rotating control device. Basically, the choke manifold can be adjusted to allow more or less fluid flow. The choke manifold can contain more than one choke, which can be used in isolation or in cooperation with each other. Often, one of the chokes is used in isolation and taken out of service for repair and refurbishment while flow is directed to a remaining choke.

The adjustment of the annulus exit, through the use of a valve, choke valve, choke manifold or other means increases the backpressure on the epoxy resin in the annulus. As a result, the pressure of the epoxy resin can be increased. Similarly, by removing some or all of the restriction, the pressure of the epoxy resin can be decreased. Accordingly, the pressure or equivalent circulating density of the epoxy resin can be controlled with increased precision. Similarly, the equivalent circulating density of the fluid can be controlled with increased precision. The pressure of the epoxy resin can be adjusted to maintain a predetermined bottom hole pressure or a predetermined equivalent circulating density. The equivalent circulating density is the effective density of the circulating fluid in the wellbore resulting from the sum of the hydrostatic pressure imposed by the column of fluid and the friction pressure. The equivalent circulating density can be expressed as lb/gallon or as kg/L or g/cm$^3$, for example. One method of calculating the equivalent circulating density of a fluid is illustrated as follows:

$$ECD = MW + \frac{P_a}{0.052 * TVD}$$

where ECD is the equivalent circulating density, MW is the density of the fluid in lb/gal, $P_a$ is the annular friction pressure in lb/in$^2$ and TVD is the depth of the fluid in ft. Although a rotating control device and choke assembly have been described, other structures can be used to achieve similar results. For example, methods of achieving the results of the present method are described more generally below.

In one embodiment, the method adjusts the backpressure of the epoxy resin by controlling the cross sectional area of the annulus exit. As discussed, restricting the cross sectional area through which a fluid flows increases the pressure of the fluid upstream from the annulus exit. Similarly, the cross sectional area of the annulus exit can be expanded to reduce the pressure of the epoxy resin upstream from the annulus exit. In one embodiment, the method adjusts the cross sectional area of the annulus exit using a valve. A valve is a device that regulates, directs or controls the flow of a fluid by opening, closing or partially obstructing various passageways, in this case the annulus or the annulus exit.

In one embodiment, the valve used to adjust the cross sectional area of the annulus exit is a choke valve. A choke valve is a valve designed to create choked flow of a fluid. In some embodiments, the choke valve operates by raising and lowering a solid cylinder into another, hollow, cylinder through which a fluid flows.

In some embodiments, the valve is adjusted according to the commands from a programmable logic controller configured to adjust the valve based on conditions in the annulus. A programmable logic controller is a digital computer. Programmable logic controllers can have multiple analog or digital input and output arrangements.

The programmable logic controller works in association with one or more pressure sensors that monitor the resin pressure, typically by measuring the pressure at the top of the annulus. Other information relevant to the control of the epoxy resin pressure, like the friction pressure in the wellbore and the hydrostatic pressure of the epoxy resin, can be calculated using computers located at the drill site. A pressure sensor is a device or apparatus adapted to measure the pressure of a fluid. The pressure sensor can, for example, communicate with the programmable logic controller.

The programmable logic controller controls a valve or annulus exit in response to signals received from the pressure sensors or received from the downhole pressure simulator, which represent the conditions in the annulus. For example, the programmable logic controller can cause the valve to decrease the cross sectional area of the annulus exit when the sensor indicates that the resin pressure is below the pore pressure of the formation. Additionally, the programmable logic controller can cause the valve to increase the cross sectional area of the annulus exit when the sensor indicates that the resin pressure is above the fracturing pressure of the formation. More preferably, the programmable logic controller can adjust the pressure of the epoxy resin to maintain the pressure of the epoxy resin above the pore pressure of the formation and below the fracturing pressure of the formation.

The programmable logic controller adjusts the fitting or valve using a real time hydraulic model. A real time hydraulic model is a mathematical model that predicts the properties of the epoxy resin throughout the well system using information, for example, pressure from the pressure sensors, to periodically update the predicted state of epoxy resin throughout the wellbore and components used in the disclosed method. Optionally, the real time hydraulic model can also use information like the temperature and flow rate of the epoxy resin at various points throughout the system.

The described method can be used in a formation wherein the difference between the pore pressure and the fracturing pressure of the formation is less than 0.5 pounds per gallon. Although pressure can be expressed as a unit of force per area, pressure can also be expressed as the density of a fluid, as is typical in the oil and gas industry. For example, where the pore pressure of a formation is 10 lb/gal, the effective circulating density of the wellbore must be at least 10 lb/gal to resist the pore pressure of the formation. As such, where the difference between the pore pressure and the fracturing pressure is less than 0.5 pounds per gallon, the effective ECD of the wellbore cannot deviate by more than 0.5 pounds per gallon without either dropping below the pore pressure of the formation or exceeding the fracturing pressure of the formation.

As indicated above, epoxy resins are reactive polymers and prepolymers, which contain epoxide groups. Suitable epoxy resins include diglycidyl ether of bisphenol A, cyclohexane dimethanol diglycidyl ether, or butyl glycidyl ether and mixtures thereof.

In some embodiments, the epoxy resin can also comprise barite, silica, hollow glass spheres or fly ash cenospheres. Such materials have varying densities and can be added to the epoxy resin to control the density of the epoxy resin. For example, a dense material such as barite can be added to the epoxy resin to increase the density of the epoxy resin. Similarly, a less dense material such as hollow glass spheres can be added to the epoxy resin to decrease the density of the epoxy resin. The epoxy resin can be introduced into the formation as a neat epoxy formulation, mixed with modifiers, or introduced as a cement slurry.

The epoxy resin can be foamed with entrained gas. A variety of gases can be used to foam the epoxy resin, including nitrogen or air. The nitrogen or air can be introduced downstream of a pump used to pump the epoxy composition into the well. In some embodiments, the epoxy resin can be immiscible with water. Being immiscible with water means that the epoxy resin resists forming a homogenous solution with water. Immiscibility with water can provide an advantage by discouraging the entrance of water from the formation into the epoxy resin. In another embodiment, the epoxy resin can have a variety of density ranges. For example, the epoxy resin can have a density of from about 6 to about 17, about 8 to about 15 or about 10 to about 13 lbs/gal.

Further, the epoxy resin can comprise a hardener. A hardener is a compound added to the epoxy resin. A hardener is a compound that reacts with the epoxy resin to promote the hardening of the epoxy resin. Examples of hardeners include diethyltoluene diamine and polyetheramines. The epoxy resin can also comprise an accelerator. An accelerator is a compound added to epoxy resin that increases the rate at which the epoxy resin hardens. Examples of suitable accelerators include 2,4,6-tris(dimethylaminomethyl)phenol. In some embodiments, a mixture of epoxy resin and cement can be used to fix a casing string in a wellbore. Various mixtures of epoxy resin and cement can be used. For example, the mixture can exist anywhere from about 1 percent cement and about 99 percent resin, about 40 percent cement and about 60 percent resin, or anywhere from about 5 to about 30 percent resin and from about 95 to about 70 percent cement by volume.

As discussed, the disclosed method can be used as part of a system to fix or cement a casing in a well. The exemplary epoxy resin compositions disclosed herein can directly or indirectly affect one or more components or pieces of equipment associated with the preparation, delivery, recapture, recycling, reuse, and/or disposal of the disclosed epoxy resin compositions. For example, the disclosed epoxy resin compositions may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary binder compositions.

The disclosed epoxy resin compositions may also directly or indirectly affect any transport or delivery equipment used to convey the binder compositions to a well site or downhole such as, for example, any transport vessels, conduits, pipelines, trucks, tubulars, and/or pipes used to compositionally move the binder compositions from one location to another, any pumps, compressors, or motors (e.g., topside or downhole) used to drive the binder compositions into motion, any valves or related joints used to regulate the pressure or flow rate of the binder compositions, and any sensors (i.e., pressure and temperature), gauges, and/or combinations thereof, and the like.

The disclosed epoxy resin compositions may also directly or indirectly affect the various downhole equipment and tools that may come into contact with the epoxy resin compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Referring now to FIG. 1, a system that may be used in the preparation of an epoxy resin composition in accordance with example embodiments will now be described. FIG. 1 illustrates a system 2 for preparation of an epoxy resin composition and delivery to a well bore in accordance with certain embodiments. As shown, the epoxy resin composition may be mixed in mixing equipment 4, such as a jet mixer, recirculating mixer, or a batch mixer, for example, and then pumped via pumping equipment 6 to the well bore. In some embodiments, the mixing equipment 4 and the pumping equipment 6 may be disposed on one or more trucks as will be apparent to those of ordinary skill in the art. In some embodiments a jet mixer may be used to continuously mix the epoxy resin composition as it is being pumped to the well bore.

Figure 2A:
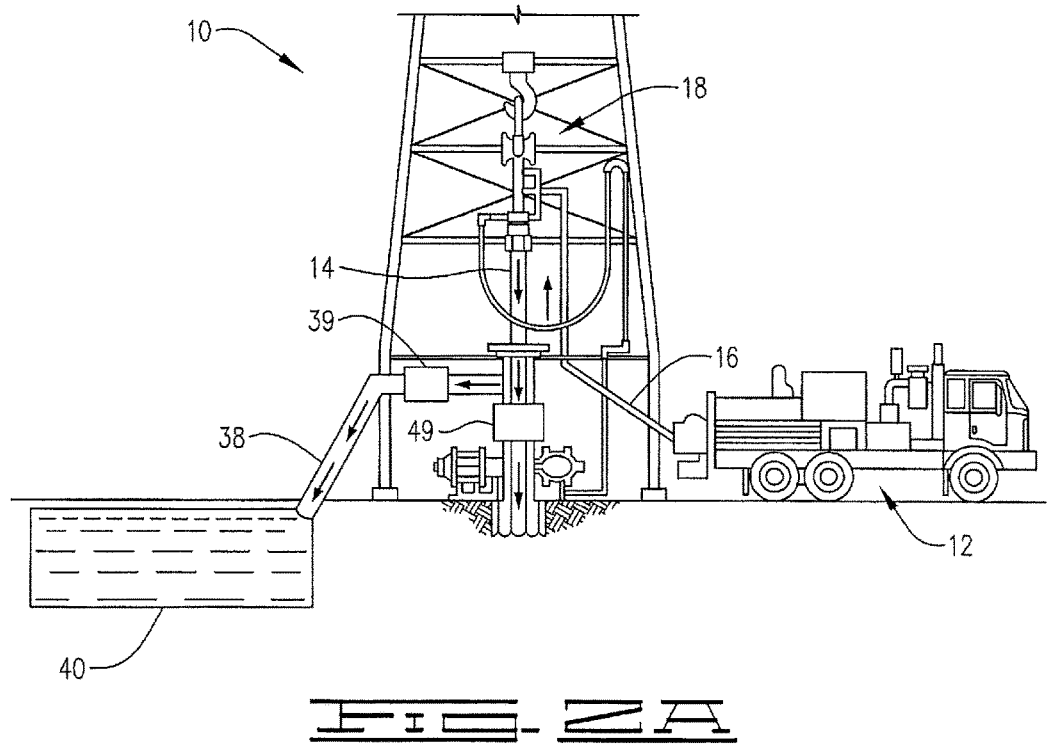
FIG. 2A illustrates an example of surface equipment that may be used to place a cement composition in a well bore.

An example technique and system for placing an epoxy resin composition into a subterranean formation will now be described with reference to FIGS. 2A and 2B. FIG. 2A illustrates surface equipment 10 that may be used in placement of an epoxy resin composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. As discussed, a cementing unit may be useful in the handling of cement, but can also handle epoxy resin compositions. The cementing unit 12 may pump an epoxy resin composition 14 through a feed pipe 16 and to a cementing head 18 which conveys the epoxy resin composition 14 downhole. The rotating control device 49 can be positioned above the formation and helps form a seal between the atmosphere and the fluid in the formation. The choke valve 39 may also optionally be a choke manifold assembly with multiple valves. As discussed, the purpose of the choke valve 39 is to exert backpressure on the fluid in the annulus.

Figure 2B:
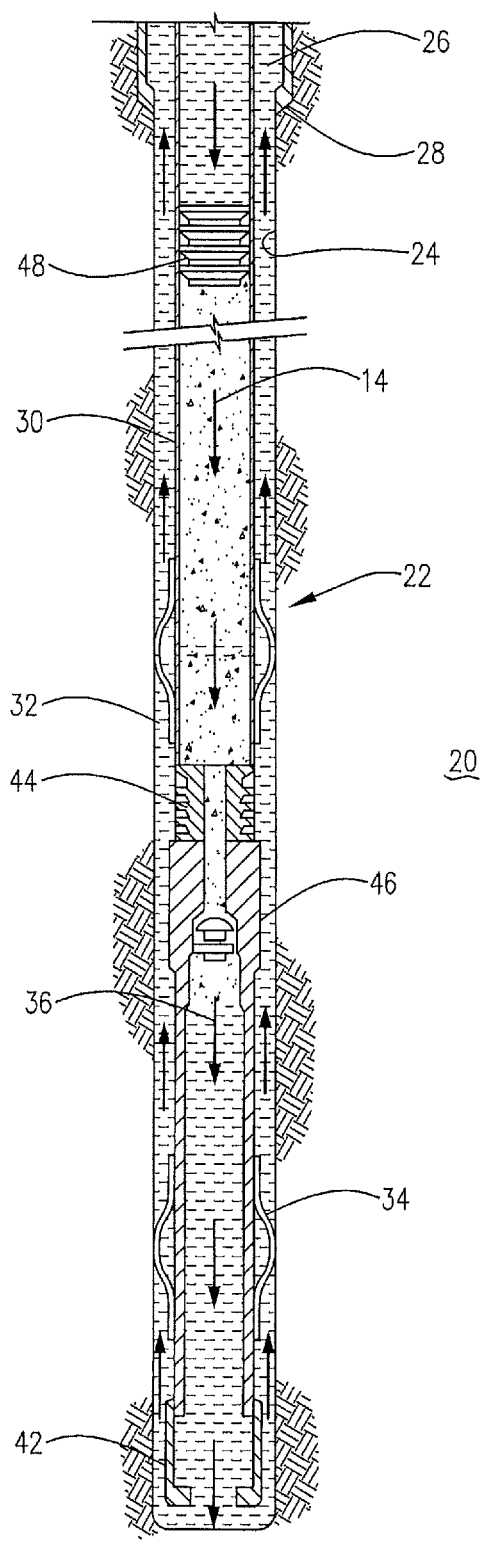
FIG. 2B illustrates an example of placement of a fluid into a wellbore annulus.

Turning now to FIG. 2B, the epoxy resin composition 14 may be placed into a subterranean formation 20 in accordance with example embodiments. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 comprises walls 24. In the illustrated embodiments, a surface casing 26 has been inserted into the well bore 22. The surface casing 26 may be fixed to the walls 24 of the well bore 22 by sheath 28. In the illustrated embodiment, one or more additional conduits (e.g., intermediate casing, production casing, liners, etc.) shown here as casing 30 may also be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 2B, the epoxy resin composition 14 may be pumped down the interior of the casing 30. The epoxy resin composition 14 may be allowed to flow down the interior of the casing 30 through the casing shoe 42 at the bottom of the casing 30 and up around the casing 30 into the well bore annulus 32. The epoxy resin composition 14 may be allowed to set in the well bore annulus 32, for example, to form a sheath that supports and positions the casing 30 in the well bore 22. While not illustrated, other techniques may also be utilized for introduction of the epoxy resin composition 14. By way of example, reverse circulation techniques may be used that include introducing the epoxy resin composition 14 into the subterranean formation 20 by way of the well bore annulus 32 instead of through the casing 30.

As it is introduced, the epoxy resin composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line 38 and be deposited, for example, in one or more retention pits 40 (e.g., a mud pit), as shown on FIG. 2A.

Referring again to FIG. 2B, a bottom plug 44 may be introduced into the well bore 22 ahead of the epoxy resin composition 14, for example, to separate the epoxy resin composition 14 from the fluids 36 that may be inside the casing 30 prior to cementing. After the bottom plug 44 reaches the landing collar 46, a diaphragm or other suitable device ruptures to allow the epoxy resin composition 14 through the bottom plug 44. In FIG. 2B, the bottom plug 44 is shown on the landing collar 46. In the illustrated embodiment, a top plug 48 may be introduced into the well bore 22 behind the epoxy resin composition 14. The top plug 48 may separate the epoxy resin composition 14 from a displacement fluid 50 and also push the epoxy resin composition 14 through the bottom plug 44.

Turning to FIG. 3, an example of how information can flow in one embodiment of the present disclosure is provided. First, properties of the epoxy resin are measured as they flow into the casing string 305. For example, a flowmeter can calculate the flow rate of the epoxy resin. Other sensors can measure other properties like pressure and temperature of the epoxy resin as it flows into the casing string.

Next, characteristics of the epoxy resin are calculated 310. For example, the measured properties can be conveyed to one or more computer systems having one or more databases or models. For example, the measured properties of the epoxy resin can be conveyed to a computer having access to a model such as iCem® as provided by Halliburton. Examples of properties that can be calculated include stage information, rheological properties, fluid loss parameters, density, compressibility and the like.

Having calculated the characteristics of the epoxy resin flowing into the casing string, the computer or other apparatus used to calculate the characteristics of the epoxy resin conveys such information to a computer related to the managed pressure drilling system in step 315. For example, each rig where managed pressure drilling is being performed can have one or more computers also having access to the iCem®.

Simultaneously or nearly simultaneously, the properties of the fluid flowing out of the annulus or the annulus exit are also measured. For example, a coriolis flowmeter can measure the flow rate of fluid out of the annulus exit. Additionally, the properties of the fluid can be measured and conveyed to the computer related to the managed pressure drilling system 320.

The computer related to the managed pressure drilling system then performs calculations to estimate or model the characteristics of the epoxy resin downhole in step 325. For example, the computer can perform mass, volume, mole, momentum or energy balances. For further example, the computer related to the managed pressure drilling system can perform state calculations. Based on such calculations and any other relevant information, the computer related to the managed pressure drilling system sends commands to the managed pressure drilling system in step 330. For example, the computer related to the managed pressure drilling system can instruct the managed pressure drilling system to increase the pressure in the system or decrease the pressure in the system.

The present disclosure provides a method for fixing a string in a wellbore in an underground formation having a pore pressure and a fracturing pressure. The method can comprise providing an epoxy resin and introducing epoxy resin into an annulus defined by the casing string and an inner wall of the wellbore. The epoxy resin can be at an annulus pressure within the annulus and the annulus can comprise an annulus exit. The method can further comprise exerting backpressure on the epoxy resin using a valve. Further, the valve can be a choke valve. Additionally, the valve can be adjusted according to commands from a programmable logic controller. Even further, the method can include using pressure sensors to monitor the annulus pressure, the fracturing pressure and the pore pressure of the formation.

The programmable logic controller can cause the valve to decrease the cross sectional area of the annulus exit when the pressure sensor indicates that the resin pressure is at or below the pore pressure of the formation and can cause the choke valve to increase the cross sectional area of the annulus exit when the resin pressure is at or exceeds the fracturing pressure of the formation. In various embodiments, the programmable logic controller is configured to implement a real time hydraulics model. This real time model is used to compute the effective circulating density for given locations along the wellbore, and use the control system and variable choke to ensues that the ECD stays between the formation pore pressure and the fracturing pressure.

Also, the method can be applied to formations wherein the difference between the pore pressure and the fracturing pressure is less than about 0.5 pounds per gallon. Additionally, the epoxy resin used with the present method can include barite, silica, hollow glass spheres or fly ash cenospheres. Further, the epoxy resin can be foamed with entrained gas. In various embodiments, the epoxy resin can also be immiscible with water. In some embodiments, the epoxy resin can have a density from about 6 pounds per gallon to about 17 pounds per gallon, about 8 to about 15 pounds per gallon or about 10 to about 13 pounds per gallon.

The epoxy resin can also consist essentially of or comprise compounds selected from the list consisting of: diglycidyl ether of bisphenol A, cyclohexane dimethanol diglycidyl ether, butyl glycidyl ether and mixtures thereof. The epoxy resin can also consist essentially of or comprise a hardener selected from the list consisting of diethyltoluene diamine, polyetheramines and mixtures thereof. The epoxy resin can also comprise 2,4,6-tris(dimethylaminomethyl) phenol. Additionally, the epoxy resin composition can be mixed using mixing equipment and can be introduced into a wellbore using one or more pumps.

What is claimed is:

1. A method for fixing a casing string in a wellbore in an underground formation having a pore pressure and a fracturing pressure, comprising:
   introducing an epoxy resin into an annulus defined by the casing string and an inner wall of the wellbore wherein the epoxy resin is at an annulus pressure within the annulus;
   exerting backpressure on the epoxy resin as it flows through the annulus such that the annulus pressure is between the pore pressure and the fracturing pressure; and
   allowing the epoxy resin to set in the annulus to thus fix the casing string in the wellbore.

2. The method of claim 1, wherein the annulus has a cross sectional area, and wherein exerting backpressure on the epoxy resin is performed by adjusting the cross sectional area of an annulus exit using a valve.

3. The method of claim 2, wherein the valve is a choke valve.

4. The method of claim 2, wherein the valve is adjusted according to commands from a programmable logic controller.

5. The method of claim 4, wherein the programmable logic controller causes the choke valve to increase the cross sectional area of the annulus exit to maintain the pressure of the epoxy resin below the fracturing pressure and causes the choke valve to decrease the cross sectional area of the annulus exit to maintain the pressure of the epoxy resin above the pore pressure.

6. The method of claim 5, wherein the programmable logic controller is configured to implement a real time hydraulics model.

7. The method of claim 6, wherein the difference between the pore pressure and the fracturing pressure is less than about 0.5 pounds per gallon.

8. The method of claim 1, wherein the epoxy resin comprises barite, silica, hollow glass spheres or fly ash cenospheres.

9. The method of claim 1, wherein the epoxy resin is foamed with entrained gas.

10. The method of claim 1, wherein the epoxy resin is introduced into the annulus as a cement slurry.

11. The method of claim 1, wherein the epoxy resin is immiscible with water.

12. The method of claim 1, wherein the epoxy resin has a density from about 6 pounds per gallon to about 17 pounds per gallon.

13. The method of claim 1, wherein the epoxy resin has a density from about 8 to about 15 pounds per gallon.

14. The method of claim 1, wherein the epoxy resin has a density from about 10 to about 13 pounds per gallon.

15. The method of claim 1, wherein the epoxy resin consists essentially of a compound selected from the list consisting of: diglycidyl ether of bisphenol A, cyclohexane dimethanol diglycidyl ether, butyl glycidyl ether and mixtures thereof.

16. The method of claim 15, wherein the epoxy resin comprises a hardener selected from the list consisting of: diethyltoluene diamine, polyetheramines and mixtures thereof.

17. The method of claim 16, wherein the epoxy resin comprises 2,4,6-tris(dimethylaminomethyl)phenol.

18. The method of claim 17, further comprising mixing the components of the epoxy resin composition using mixing equipment.

19. The method of claim 18, wherein the epoxy resin composition is introduced into the well bore using one or more pumps.

* * * * *